United States Patent [19]

Maple et al.

[11] 4,139,142

[45] Feb. 13, 1979

[54] ABOVEGROUND ANCHOR SUPPORT ASSEMBLY FOR A PIPELINE

[75] Inventors: James A. Maple, Anchorage, Ak.; Conrad E. Jacobson, Parsippany, N.J.

[73] Assignees: Exxon Research & Engineering Company; Exxon Production Research Company, both of Del.

[21] Appl. No.: 688,304

[22] Filed: May 20, 1976

[51] Int. Cl.² .................................................. F16L 3/16

[52] U.S. Cl. ...................................... 228/175; 228/176; 248/49; 248/55

[58] Field of Search .................... 248/49, 54 R, 55, 70, 248/180, 181, 345.1, 22, 122, 371; 138/106; 61/105; 29/428, 445; 214/1 PA; 228/175, 176

[56] References Cited

U.S. PATENT DOCUMENTS

| | | | |
|---|---|---|---|
| 675,106 | 5/1901 | Oberle | 248/49 |
| 1,470,529 | 10/1923 | Gerber | 248/49 |
| 2,533,370 | 12/1950 | Haug | 248/55 |
| 2,634,935 | 4/1953 | Carpenter | 248/181 |
| 3,182,814 | 5/1965 | Albrecht | 214/1 PA |
| 3,387,482 | 6/1968 | Wilcock et al. | 248/181 X |
| 3,622,112 | 11/1971 | Stroh | 248/181 |
| 3,788,083 | 1/1974 | Lundgren | 61/105 |
| 3,809,348 | 5/1974 | Di Laura | 248/87 X |

*Primary Examiner*—Rodney H. Bonck
*Attorney, Agent, or Firm*—Christensen, O'Connor, Johnson & Kindness

[57] ABSTRACT

An anchor support for supporting a pipeline above the ground has a self-aligning support saddle that allows the pipeline to orient itself on the anchor support during construction to relieve stresses in the pipeline and to allow for variations from nominal pipeline elevation and angulation relative to the ground. The anchor support normally fixes the pipeline's position relative to the ground but also allows relative movement between the support and the pipeline upon occurrence of a seismic disturbance or other disturbance that would cause a dislocation of the pipeline and/or anchor support from its nominal position. The self-aligning support saddle, which includes a ball and socket connection for allowing the pipeline to orient itself over the saddle, is fastened to a shiftable subassembly that rests on a stationary base assembly affixed to one or more ground engaging vertical support members. After the pipeline is aligned, the ball and socket can be permanently interconnected to restrain any further movement of the pipeline relative to the shiftable subassembly.

5 Claims, 8 Drawing Figures

10
16
32b
36
34
34
36
114
32a
30
24
118
28
26

12
18
22
18
20
16
16
18
18
16

12
14
10

14
14
12
14
14

32b
30
32a
28
10
24
20
12
22
18

16
16

32a
30
10'
32b
24
28
22
20
12
18

16
16

7
12
64
46
64
16
16
62
56
22
24
72
102
48
50
10
108
100
106
84
112
26
30
6
6
96
114
92
90
116
70
86
60
58
16
16
44
64
64
7

10'
32b
36
34
32a
30
38
38
28
5
24
12
118
114
120
116
124
122
26
110
112
5
96
90
94
94
88
86
98
48
22
16
50
16
64
64
20

32b
10
34
36
36
34
16
16
32a
30
24
12
28
26
74 70
72
76
78
94 90
80
66
68
84
86
44
46
110
104
102
100
106
58
96 92
56
52
82
54
22
64
64
18

24
114
120
110
50
90
88
94
86
96
22

ABOVEGROUND ANCHOR SUPPORT ASSEMBLY FOR A PIPELINE

BACKGROUND OF THE INVENTION

The present invention relates to support assemblies for aboveground structures, and more particularly to support assemblies for aboveground pipelines including a self-aligning support saddle.

The most economical means for transporting crude oil or other petroleum products through Arctic regions is a pipeline. Normally such pipelines are subterranean, that is, they are installed in back filled trenches that interconnect one or more pumping stations between a well and a shipping terminal or refinery. Through certain Arctic regions, however, a subterranean pipeline is not feasible as the permafrost that constitutes the soil will not, under certain termperature conditions, support the weight of a buried pipeline. Since the oil or petroleum traveling through the pipeline has an average temperature that resides above 32° F., the heat of the oil in the pipeline combined with atmospheric heat during the summer months will melt the permafrost and destroy its supporting qualities, thus allowing the pipeline to move or sag within the ground and potentially causing damage to the pipeline. The solution to this problem has been to place portions of the pipeline above the ground.

Not only are pipelines generally not supported above the ground because of the additional cost involved in constructing an aboveground pipeline, but Arctic conditions, especially those that exist between the north slope of Alaska and the southern coast of Alaska, present problems that have heretofore been unencountered in the construction of a pipeline. First of all, vertical support members or pilings must generally be oriented perpendicularly to the plane of the horizon, that is vertically, so as to achieve maximum strength with minimum structure and cost. The topography over which the pipeline traverses dictates that the pipeline at any given support location will not always be oriented at the same height and angulation as at the previous or the succeeding support location. To design individual interconnecting assemblies for the pipeline and the vertical support members that could individually accommodate the varying orientation would be very expensive.

Moreover, in many Arctic areas, the pipeline must traverse regions in which seismic disturbances are likely to occur. A seismic disturbance could easily cause a shift in the ground and thus the pipeline support structures over a portion of the pipeline route. This in turn could cause the pipeline support structures for a portion of the pipeline to shift relative to adjacent support structures. If the support structures and the pipe were rigidly connected, such a shift might impress undue stress on the pipeline, causing damage to the line and potentially rupturing the line, resulting in an undesireable spill of crude oil.

It is, therefore, a broad object of the present invention to provide a support assembly for interconnecting a pipeline with an aboveground support member, which interconnecting structure includes a self-aligning support assembly to eliminate the need for many individually designed and constructed support structures and to minimize the labor and time required to install the support structures and the pipeline. Further objects of the present invention are to provide an interconnecting structure that is easily fabricated, that is inexpensive to construct, that can be permanently affixed to the pipeline and to the ground support member, and that can allow for rotational, angular and longitudinal adjustment of the pipeline relative to the support structure to ease construction and to relieve stresses in the pipeline during installation.

SUMMARY OF THE INVENTION

In accordance with the foregoing objects and other objects that will become apparent to one of ordinary skill in the construction art upon reading the following specification, the present invention provides a method and apparatus for interconnecting a load-carrying member and a normally stationary ground support member to allow the load-carrying member to align itself on the support member, thereby relieving stresses imposed on the load-carrying member during construction. One use of this method is in the construction of aboveground pipelines. In that environment the method includes the step of forming a recess having a circular opening in a first member and affixing the first member to either the pipeline or the ground support member so that the axis of revolution of the opening intersects the path of the pipeline over the ground support member. Thereafter, a second member is formed so that a portion of the surface thereof is spherically shaped, which connecting member is then affixed to the other one of the pipeline or ground support member. The spherically shaped surface portion on the connecting member is formed with a radius greater than the radius of the circular opening in the first member so that when the pipeline is positioned over the ground support member, the spherically shaped surface portion of the connecting member can be only partially inserted into the circular opening. Thereafter, the pipeline is positioned over and allowed to rest freely on the connecting member and the first member so that the spherical surface portion on the connecting member can rotate in the circular opening of the first member, thereby relieving torsional and bending stresses imposed on the pipeline during construction of adjacent portions of the line. Preferably, the spherically shaped surface portion of the connecting member is permanently affixed to the first member after the stresses in the pipeline have been relieved.

A preferred apparatus for achieving this method includes a hemispherical member attached to a collar designed to be clamped around the pipeline. A support saddle affixed to a ground support member holds an annularly shaped member in a generally upright orientation. Before the collar is clamped tightly on the pipe, the hemispherical member is partially inserted into the opening in the annular member while the longitudinal position of the collar is adjusted on the pipe to locate the hemispherical member directly over the opening. Thereafter, the collar is fastened to the pipe and the hemispherical member is inserted into the annular member, allowing the pipe to rest freely on the annularly shaped member so that the pipe can align itself during construction of adjacent portions of the line. Thereafter, the annularly shaped member can be welded to the hemispherical member to permanently affix the pipeline to the ground support member.

BRIEF DESCRIPTION OF THE DRAWINGS

A better understanding of the present invention can be derived by reading the ensuing specification in conjunction with the accompanying drawings wherein.

DETAILED DESCRIPTION

Figure 1:
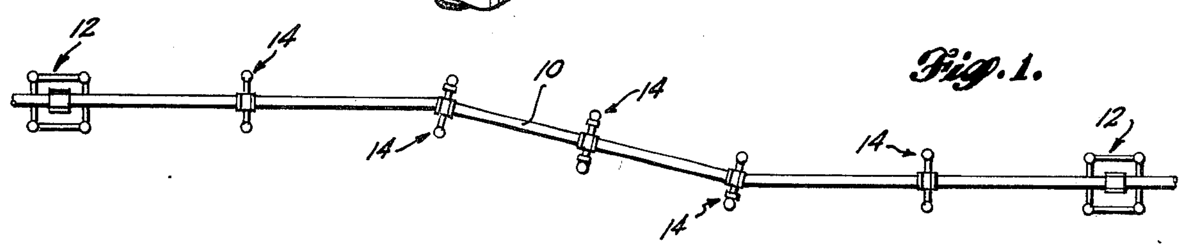
FIG. 1 is a plan view of a portion of a pipeline showing a pair of anchor supports at spaced locations along the pipeline with a plurality of intermediate support assemblies spaced between the anchor supports.

Referring to FIG. 1, a single section of pipeline 10 is shown strung between and supported above the ground by two anchor supports 12, normally spaced from about 900 to about 1800 feet apart. A plurality of intermediate supports 14 support the pipeline above the ground between the anchor supports 12. The pipeline is constructed in repetitive zig-zag segments, one of which is located between each adjacent set of anchor supports 12, so as to allow the pipeline to expand and contract under transient and seasonal temperature changes, as well as to allow for lateral and longitudinal shifting of the pipeline upon occurrence of seismic disturbances that may cause one or more of the anchor supports or intermediate supports to shift relative to the pipeline. Other configurations can also be employed along the pipeline as necessary. The intermediate supports are so constructed as to allow relatively free longitudinal and lateral movement of the pipeline relative thereto. The intermediate supports are described in further detail in the commonly owned copending patent application, Ser. No. 686,882, filed May 17, 1976.

The pipeline 10 is releasably affixed to each of the anchor supports 12 so that, under transient and seasonal temperature changes and under the influence of minor seismic disturbances or other pipe dislocating accident, the pipe cannot move any substantial amount relative to the anchor supports 12. As will be described in greater detail below, the anchor support incorporates a support subassembly attached to the pipeline that is shiftable relative to the anchor support in a direction substantially parallel to the path of the pipeline. By path of the pipeline it is meant the longitudinally extending path over which the pipeline is laid in plan view. Under normal circumstances, the pipeline is restrained from any substantial movement by cooperation of the shiftable subassembly with the supporting framework on the anchor support until a predetermined differential force is applied between the pipeline and the anchor support. Upon application or occurrence of a predetermined differential force, the shiftable subassembly is released so that it can slide relative to the anchor support. When the term differential force is used herein it is intended to encompass the arithmetic summation of forces and components of forces acting on the pipeline and the anchor support in a direction substantially parallel to the path of the pipeline.

Figure 4:
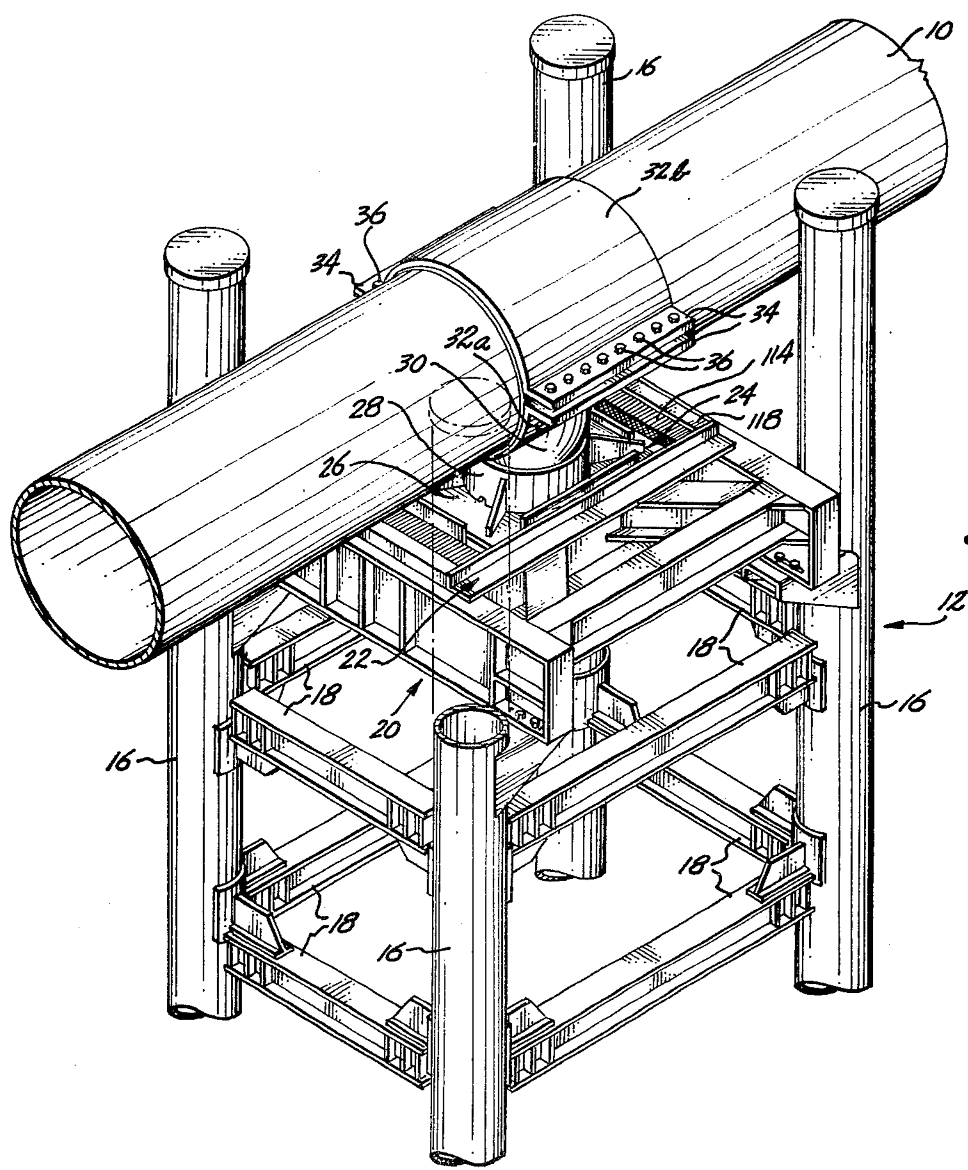
FIG. 4 is a detailed isometric view of an anchor support of the present invention showing a segment of a pipeline supported thereby.
Figure 2:
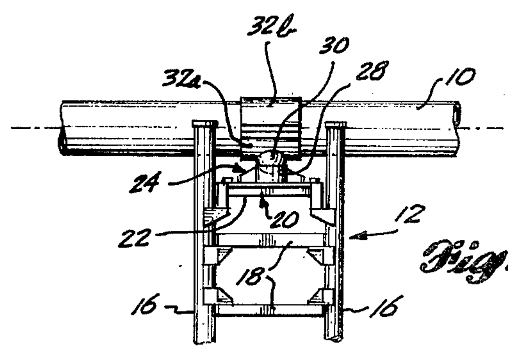
FIG. 2 is a side elevation view of an anchor support assembly of the present invention showing the pipeline oriented perpendicularly to the vertical support members forming part of an anchor support.

Referring to FIGS. 2 and 4, the anchor support 12 includes four vertical support members 16 in the form of pilings or other vertical members that are arranged in a rectangular array and are permanently affixed to or embedded in the ground. Although four vertical support members are employed in the preferred embodiment, more or fewer vertical support members can be used as necessary, as can other means of support. In the preferred embodiment, cross braces 18 rigidify the vertical support members and hold them in a fixed relationship to each other. The cross braces can be omitted when they are not required for structural purposes. The cross braces 18 extend longitudinally and laterally between each of the adjacent vertical support members to form a rectangular framework at a location between the ground and the top of the vertical support member. In the preferred embodiment, two vertically spaced sets of cross braces are employed to structurally enhance the overall anchor support. A support assembly, generally designated 20, is mounted above the cross braces on the vertical support members and includes a base framework 22 and a shiftable subassembly bearing a self-aligning anchor saddle 24.

Figure 6:
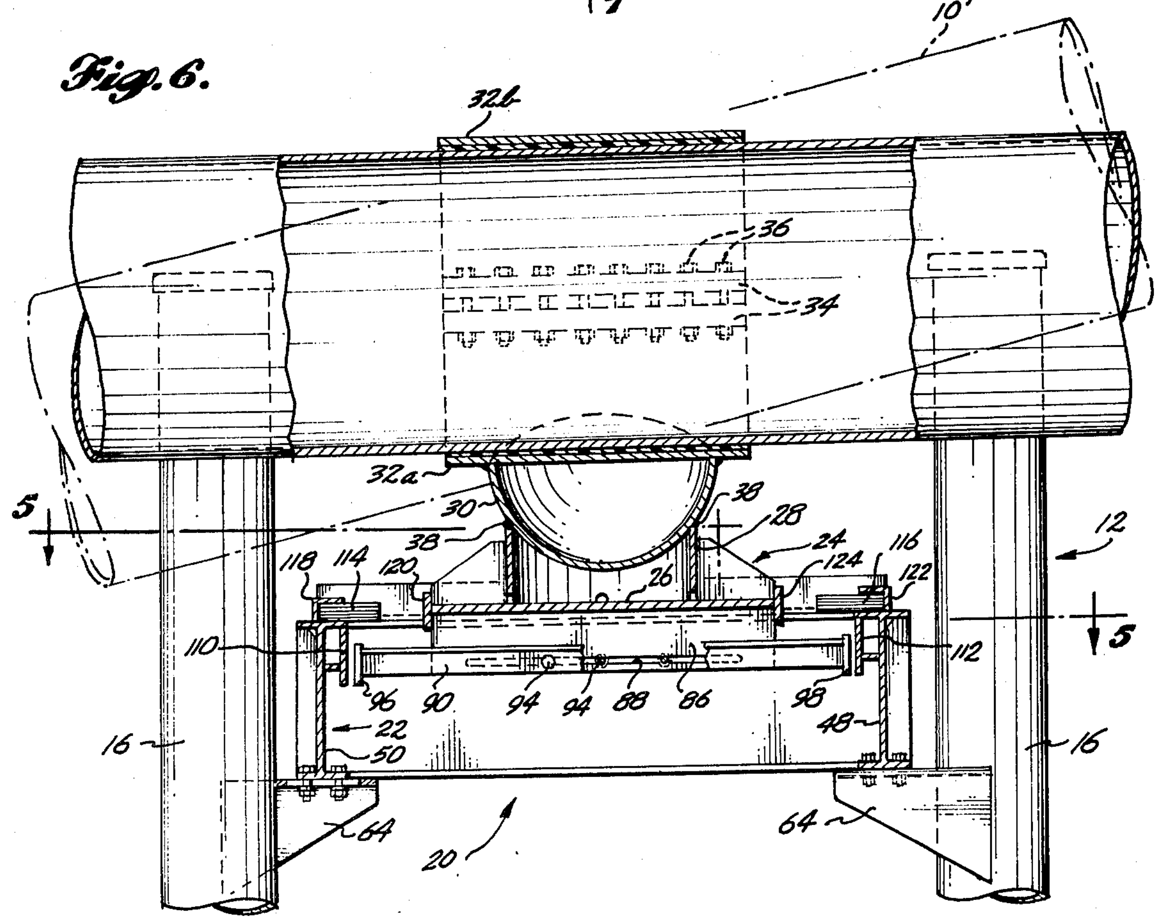
FIG. 6 is a vertical sectional view of the anchor support taken along section line 6—6 of FIG. 5 showing the pipeline partially cut away.
Figure 7:
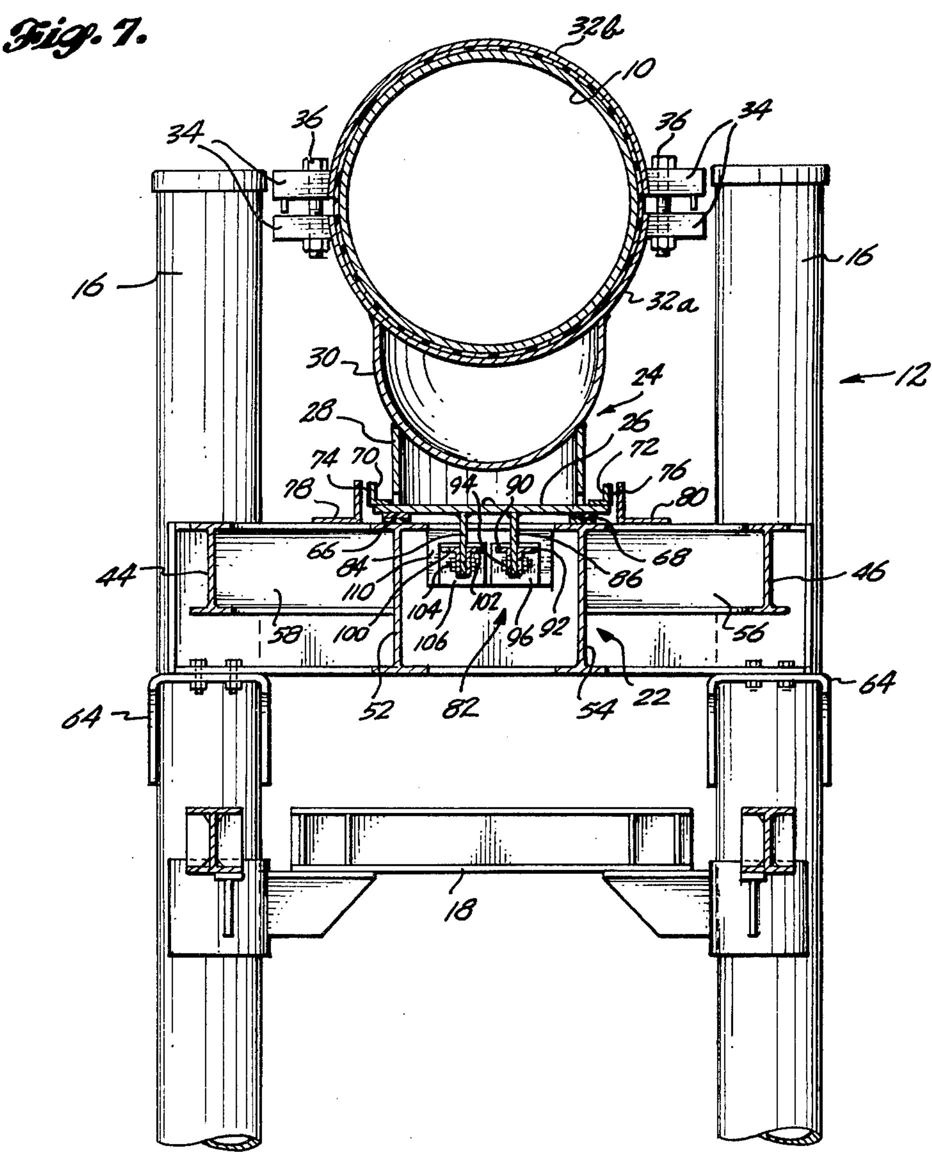
FIG. 7 is a vertical sectional view of the anchor support of the present invention taken along section line 7—7 of FIG. 5.

As best viewed in FIGS. 2, 4 and 6, the anchor saddle 24 comprises a horizontal anchor base plate 26 upon which rests an upright support socket 28. The support socket is an annularly shaped member, having its axis of revolution oriented in an upright direction, and preferably the axis is vertically oriented. The annular member generally has thin walls and can be constructed from a section of pipe or a similar structure if desired. The annular member has an upwardly facing circular opening generally defining a plane orthogonal to the axis of the annular member, which opening forms a support socket for a downwardly extending, hemispherical member 30. The diameter of the circular opening in the support socket 28 is less than the diameter of the hemispherical member 30, the relative diameters of the two being chosen so that the hemispherical member 30 can be only partially inserted into the support socket 28 to form a ball and socket type, universally orientable, support joint or saddle. An upper, cylindrically shaped extension of the hemispherical member 30 is affixed to the lower half 32*a* of a generally annularly shaped pipe clamp. The upper end of the extension is configured so that its entire periphery continuously abuts the lower half 32*a* of the clamp.

The pipe clamp has a conventional configuration and includes a semiannular upper half 32*b* and the semiannular lower half 32*a*. Each of the clamp halves are sized to wrap about halfway around the pipe 10 so that the clamp halves are vertically separated from each other at diametric locations relative to the pipeline. Each of the clamp halves bears generally radially outwardly extending flanges adjacent the separation location of the clamp halves. The flanges on the same side of the clamp halves form a flange pair and are generally horizontally oriented and are spaced from and parallel to each other. A plurality of generally vertically oriented, mutually aligned bores extend through each of the flange pairs. Suitable bolts inserted through the bores in each of the flange pairs are tightened down to securely fasten the flange pairs together and thus the clamp halves to the pipeline. A suitable thermal and electrical insulating sleeve is preferably interposed between the clamp and the pipeline to thermally and electrically isolate the pipeline from the anchor support structure.

Figure 3:
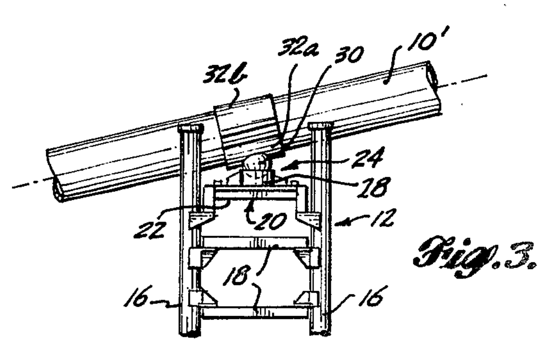
FIG. 3 is a side elevation view similar to FIG. 2 showing the pipeline oriented at an angle other than perpendicular to the vertical support members forming part of an anchor support.
Figure 5:
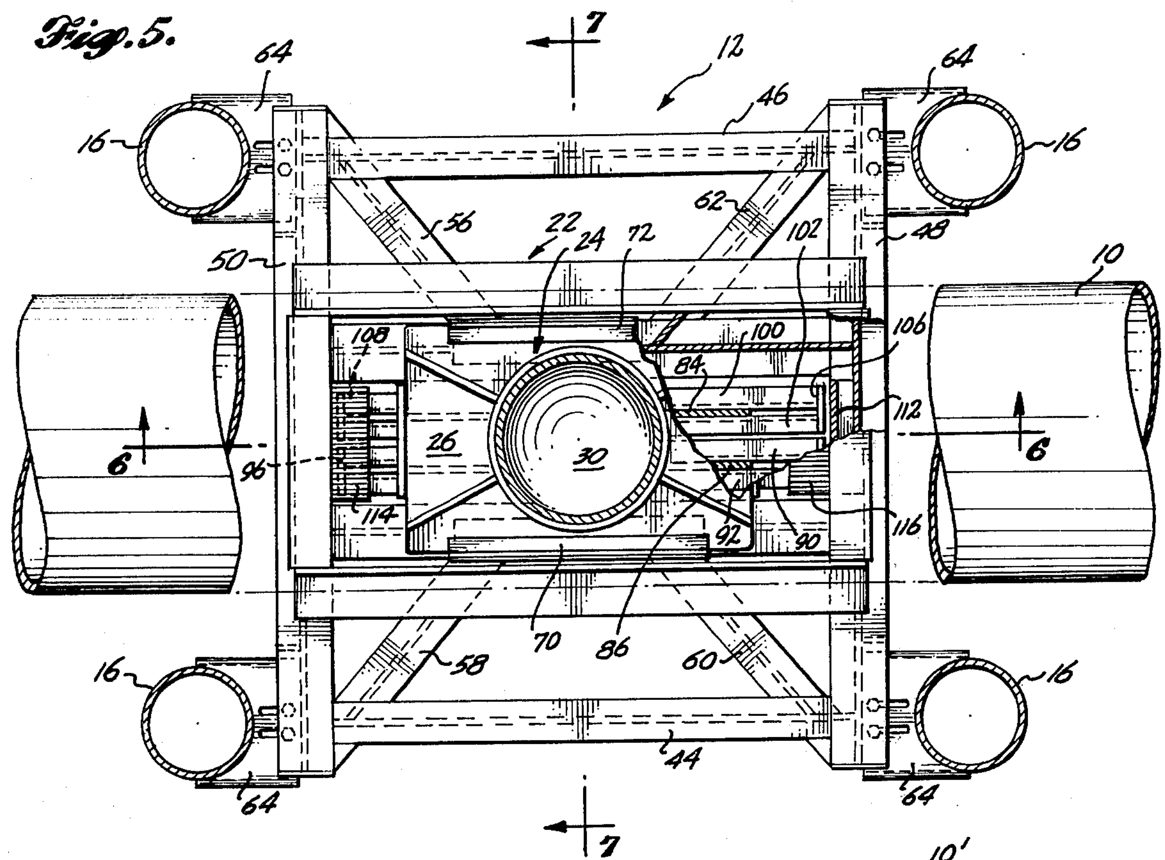
FIG. 5 is a horizontal sectional view through a portion of the anchor support taken substantially along the dual level section line 5—5 of FIG. 6 with the cutaway portions thereof taken along the lower level of the section line and the remainder of the sectional view taken along the upper level of the dual level section line 5—5.

During construction, the vertical support members and the support assembly 20 as well as the cross bracing 18 are erected at predetermined locations along the pipeline route. The vertical support members are usually vertically oriented, i.e., perpendicular to the plane of the horizon. The anchor base plate 26 is generally horizontally oriented on the support assembly 20 to orient the annular support socket 28 in an upright, preferably vertical, direction. Before the pipeline 10 is positioned on the anchor support 12, the pipe clamp 32 along with the hemispherical member 30 affixed thereto is loosely coupled to the pipe and longitudinally positioned so that the hemispherical member 30 is positioned over the annular socket 28, i.e., so that the upright axis of the support socket 28 intersects the hemispherical member 30 and the path of the pipe 10. The pipe 10 is then lowered so that the hemispherical member 30 engages the support socket 28. Before the entire weight of the pipe 10 is allowed to rest on the anchor support 12, the two halves **32*a* and 32*b* of the pipe clamp are drawn toward each other by tightening the bolts 36 to secure the clamp to the pipe 10. Thereafter, the full weight of the pipe 10 is allowed to rest on the anchor saddle 24. As the pipe is positioned in the saddle and as subsequent portions of the pipe are laid on subsequent intermediate and anchor supports, the pipe can rotate in the saddle in the transverse, longitudinal, and vertical axes relative to the path of the pipeline, aligning itself on the anchor support 12 and relieving all torsional and bending stresses that might otherwise be imposed on the pipeline. The anchor saddle 24 along with the pipe clamp 32 and the hemispherical member 30 can be employed regardless of the orientation of the pipe 10. As an example, the pipe 10 is shown in FIG. 3 (and in the ghost outline in FIG. 6**) oriented at an angle relative to the plane of the horizon. The procedure of constructing and installing the self-aligning anchor is the same whether the pipe is oriented horizontally or whether it is oriented at an angle to the ground plane.

The advantages of the anchor saddle of the present invention are manifold. Among the greatest of these is the elimination of an alignment procedure when the pipeline is brought to rest upon an anchor support, since the pipeline is allowed to orient itself on the anchor saddle. Moreover, the anchor saddle is much simpler and easier to fabricate than an interconnecting mechanism that would have the capability of being adjusted for angular orientation in the longitudinal, horizontal and transverse planes. By using the self-aligning anchor saddle of the present invention, no other provision need be made for relieving stresses in the pipeline as the stresses are automatically relieved while the pipe freely rests on the anchor saddle. Moreover, the anchor saddle can be permanently interconnected once the pipe has aligned itself on the anchor support by simply welding around the periphery of the hemispherical member adjacent the upper edge of the annular socket 28 to form an interconnecting bead 38 of metal.

Referring now to FIGS. 4, 5, 6 and 7, the portion of the support assembly for allowing the pipeline to move relative to the vertical support members and the ground includes supporting framework 22, the saddle base plate 26, and its associated structure forming the base for the anchor saddle 24. The basic supporting framework includes two spaced I beams 44 and 46 oriented substantially parallel to the longitudinal dimension of the pipeline 10 and two, spaced, transversely oriented I beams that are joined to the ends of the longitudinally oriented I beams 44 and 46. The longitudinally oriented I beams 44 and 46 are transversely spaced by a distance substantially equal to the transverse spacing between the vertical support members 16. The transverse I beams 48 and 50 are spaced by a distance slightly less than the longitudinal spacing of the vertical support members 16 to form a substantially square framework. A second pair of spaced, longitudinally oriented I beams 52 and 54 are positioned between the outer longitudinally oriented I beams 44 and 46 and span between and are joined to the transverse I beam 50 and 48. The interior longitudinally oriented I beams 52 and 54 are spaced by a distance slightly less than the diameter of the pipeline, although this spacing is not critical and must only be chosen to conform with the width of the anchor support base plate 26 as will be understood later. I beam braces, generally designated 56, 58, 60 and 62, are joined to the outside surface of the webs of the longitudinally oriented interior I beams 52 and 54 and extend diagonally outwardly and are joined to the corners of the square framework. All of the I beams are oriented in an upright manner so that in elevation view they form an I with a vertical web and top and bottom horizontally oriented flanges.

The support framework 22 rests on four brackets 64 affixed respectively to the four vertical support members 16. The four brackets 64 have an upper, generally horizontal surface on which the ends of the bottom flanges of the transverse I beams 48 and 50 rest. The surfaces of the bracket 64 are provided with longitudinally oriented slots that are aligned with corresponding slots in the bottom flanges of the I beams 48 and 50. Suitable threaded fasteners inserted through the aligned slots secure the support framework 22 to the flanges 64, forming a rigid base for the support assembly. If desired, a permanent interconnection between the framework 22 and the flanges 64 can be effected by welding the two together.

The saddle base plate 26 of the anchor saddle 24 is generally rectangular and has its longitudinal dimension oriented parallel to the path of the pipeline 10. The bottom surface of the plate is sufficiently wide to transversely span the upper, horizontal flanges of both the interior I beams 52 and 54 of the support framework 22. The saddle base plate 26 rests on two friction reducing pads 66 and 68, positioned to span the longitudinal dimension of the upper flanges of the interior I beams 52 and 54. Each of the friction reducing pads 66 and 68 comprises superposed and bonded strips of low friction material such as polytetrafluoroethylene (sold under the trademark TEFLON by E. I. duPont de Nemours & Co., Wilmington, Del.) and a fiber-filled, elastomeric material such as is sold under the trademark FABREEKA by the Fabreeka Products Company of Boston, Mass. The bonded strips are affixed by conventional means to the bottom surface of the saddle base plate 26 and slide on the upper surface of the upper flange of the interior I beams 52 and 54. Thus the anchor saddle 24 is mounted on the support framework 22 for sliding movement in a direction substantially parallel to the path of the pipeline 10.

Lateral movement of the saddle base plate 26 relative to the support framework 22 is restrained by mounting a pair of angle beams adjacent each of the longitudinal sides of the base plate 26. One flange of each of the angle beams 70 and 72 is vertically oriented. Friction reducing pads 74 and 76 are respectively affixed to each of the vertically oriented flanges. A second set of longitudinally oriented angle beams 78 and 80 are mounted on the upper flanges of and span between the transverse I beams 48 and 50 forming the support framework 22. One flange of each of the larger angle beams 78 and 80 is vertically oriented so that the inner face thereof is substantially parallel to a respective one of the friction reducing pads 74 and 76 on the small angle beams 70 and 72. The exposed surfaces of the friction reducing pads 74 and 76 are inwardly spaced from the inwardly facing surfaces of the vertical flange of the large angle beams 78 and 80 to allow a limited amount of lateral movement of the saddle base plate 26 relative to the support framework 22, but to prevent any substantial lateral movement between the two. The limited amount of lateral movement is desirable to allow for minor movement upon expansion and contraction of the pipeline under transient ambient and internal temperature fluctuations. Thus the anchor saddle 24 is mounted on the support frame 22 for sliding movement in a direction substantially parallel to the pipeline but is prevented from any substantial lateral movement relative to the support frame 22.

As stated above, it is desirable for the anchor saddle to be so affixed to the ground support member (comprising the vertical support member 16 and the supporting framework 22) that a small differential force applied between the pipeline 10 and the ground support member will not precipitate any substantial movement between the pipeline and the ground support member in a direction substantially parallel to the path of the pipeline. However, after the differential force reaches a predetermined magnitude, it is desirable to allow relative movement in a direction parallel to the path of the pipeline. The pipeline is so restrained by a unique restraining assembly generally designated 82 that normally prevents substantial, relative movement between the support frame 22 and the anchor saddle 24 but will release the anchor saddle for movement in the direction of the path of the pipeline when the relative force between the two reaches a predetermined magnitude.

The restraining assembly 82 includes a pair of parallel, transversely spaced, vertically oriented, rectangular plates that have their longitudinal dimension spanning the longitudinal dimension of the saddle base plate 26. The upper edges of the rectangular plates 84 and 86 are permanently affixed to the bottom surface of the saddle base plate 26 at a location spaced inwardly from the sides of the base plate. The rectangular plates 84 and 86 are sufficiently wide in the vertical dimension to extend downwardly between the vertical webs of the interior longitudinal I beams 52 and 54 of the support framework 22. Each of the rectangular plates 84 and 86 have a longitudinally oriented slot 88 adjacent their bottom edge (this slot is best seen in FIG. 6 on plate 86). A pair of angle beams 90 and 92, each having a vertically oriented flange and a horizontally oriented flange are positioned adjacent the rectangular plate 86 so that the exterior vertical surface of the angle beam 90 is positioned in intimate frictional contact with one surface of the rectangular plate 86 while the vertically oriented exterior surface of the angle beam 92 is positioned in intimate frictional contact with the opposite surface of the rectangular plate 86. The angle beams 90 and 92 extend beyond the ends of the rectangular plate 86 and terminate short of the vertical webs of the transverse I beams 50 and 48 forming part of the support framework 22. The angle beams 90 and 92 are oriented in relation to the slot 88 in the rectangular plate 86 so that a plurality of bores through the vertical flange of the angle beams 90 and 92 are aligned with the slot 88. Suitable fasteners 94 are employed to releasably affix the angle beams 90 and 92 in position on the rectangular plate 96. Adjacent ends of the angle beams 90 and 92 are interconnected by vertically and transversely oriented bumper plates 96 and 98. In a similar manner, angle beams 100 and 102 are oriented relative to and releasably affixed to the other rectangular plate 84 by fasteners 104. The angle beams 100 and 102 have their respective ends affixed by similar bumper plates 106 and 108 (only one bumper plate 106 can be seen in FIG. 7).

A vertically and transversely oriented abutment plate 112 is affixed to the bottom interior surface of the upper flange of the transverse I beam 48 forming part of the support framework 22 and is braced in its vertical position against the web of I beam 50 by an interconnecting bar. The abutment plate 112 is oriented parallel to the bumper plates 98 and 106 and is spaced a small distance from the bumper plates 98 and 106 so that surfaces thereof are in mutually opposing relationship. In a similar manner, an abutment plate 110 is affixed to the bottom interior surface of the upper flange of the opposite transverse I beam 50 forming part of the support framework 22 so that its surface is oriented to oppose the outwardly facing surfaces of the bumper plates 96 and 108 (only one of which can be seen in FIG. 6) on the opposite ends of the angle beams 90, 92, 100 and 102.

In use, the anchor saddle 24 is centered in the longitudinal direction on the support framework 22. The angle beams 90, 92, 100 and 102 are then positioned in the slots in the rectangular plates 84 and 86 so that the outwardly facing surfaces of the bumpers on the ends thereof are slightly spaced from the abutment plates 110 and 112. Thereafter, the fasteners 94 and 104 are tightened to a predetermined torque value. In this manner, the angle beams 90, 92, 100 and 102 are fastened to the saddle base plate 26 and are restrained from relative movement along the slots in the rectangular plates 84 and 86 by the static friction between the surfaces of the angle beams that are in intimate contact with the surfaces of the rectangular plates 84 and 86.

Figure 8:
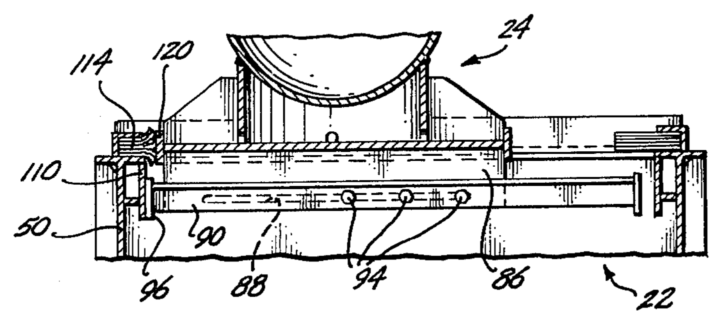
FIG. 8 is a cross sectional view similar to a portion of FIG. 6 showing the pipeline after it has moved relative to the anchor support.

As shown in FIG. 8, when a differential force is applied between the pipe 10 and the anchor support assembly 12, the anchor saddle 24 along with its substructure, including the angle beams 90, 92, 100 and 102, will move in the direction of the pipeline path relative to the support framework 22 until, for example, the bumper plates 96 and 98 abut the abutment plate 112. The anchor saddle 24 will not move any further in the longitudinal direction until the differential force applied to the pipeline reaches a predetermined value sufficient to overcome the frictional force between the angle beams and the rectangular plates. As this occurs, the anchor saddle 24 can again move longitudinally relative to the support framework 22, which movement is opposed only by the dynamic frictional force created between the angle beams and the rectangular plate. The predetermined force necessary to overcome the frictional restraining force can be varied as desired during installation since the frictional force between the angle beams and the rectangular plate is proportional to the torque value to which the angle beam fasteners 94 and 104 are tightened.

If the differential force is of great enough magnitude and causes a large relative displacement over a sufficient amount of time, the differential momentum built up between the anchor saddle 24 and the support framework 22 may be great enough so that the dynamic frictional force between the angle beams and the rectangular plates on the anchor saddle 24 may not be able to decelerate the anchor saddle sufficiently fast to prevent it from damaging the support framework 22 and/or overstressing or breaking the pipeline. Referring to FIGS. 4 through 7, a pair of energy-absorbing members 114 and 116 are provided on the support framework 22 to absorb this momentum and to decelerate and stop the relative movement between the anchor saddle and the support framework. In the preferred embodiment, crushable members 114 and 116 comprise right rectangular polyhedron, or box shaped, honeycomb panels having their longitudinal cell axes oriented in a direction substantially parallel to the path of movement of the anchor saddle and thus substantially parallel to the path of the pipeline. The honeycomb panel 114 is positioned in a retention channel formed by an angle beam 118 having a vertical flange affixed to the upper surface of the upper flange on the transverse I beam 50 and an inwardly extending horizontal flange spaced above the upper surface of the upper flange of the I beam 50. One end of the honeycomb panel 114 is positioned between the horizontal flange of the angle beam 118 and the upper surface of the upper flange of the I beam 50. The opposite end of the crushable honeycomb panel 114 extends inwardly beyond the inner edge of the upper flange on the I beam 50 and extends in the transverse dimension a distance somewhat less than the transverse dimension or width of the anchor support plate 24. Thus the crushable honeycomb panel 114 is positioned at a level substantially equal to that of the level of the saddle base plate 26. Self-tapping machine screws (not shown) hold the honeycomb panel in position between the horizontal flange of the angle beam 118 and the upper flange on the I beam 50. The screws are inserted downwardly through bores in the horizontal flange on the angle beam 118 and into threaded engagement in mutually aligned bores in the honeycomb panel 114. A bumper plate 120 is fitted to the end of the saddle base plate 26 and is vertically oriented so as to provide an abutment surface for the exposed end of the crushable honeycomb panel 114. In a like manner, the second honeycomb panel 116 is retained by an angle beam 122 on the upper surface of the upper flange of the transverse I beam 48 forming part of the support framework 20. A second bumper plate 124 is affixed to the opposite end of the saddle base plate 26 so as the oppose the location of the inner end of the second crushable honeycomb member 116 and provide an abutment surface therefor. Machine screws are again employed to hold the second honeycomb panel in place.

Referring again to FIG. 8, the anchor saddle 24 is illustrated as having been displaced sufficiently far relative to the support framework 22 so that the bumper plate has contacted and partially crushed the honeycomb panel 114. This occurred because the differential force applied between the anchor saddle 24 and the support framework 22 was adequate to overcome the static frictional force between the angle beams 90 and the rectangular plates 84 and 86 and because the dynamic frictional force between the angle beams and the rectangular plates was insufficient to stop the relative movement. As the anchor saddle approached the limit of its relative displacement, the bumper 120 abutted the honeycomb panel 114 and partially crushed the panel. As the honeycomb panel was crushed, energy was absorbed to reduce the speed of the relative movement between the anchor saddle 24 and the support framework 22 was stopped, consequently decelerating the anchor saddle to a stop.

Upon perusing the foregoing detailed description, one of ordinary skill will be able to ascertain that the preferred embodiment described above fulfills the objectives set forth in the background of the invention and provides the enumerated and other advantages of those objectives. In addition, the anchor support of the present invention has other advantages not yet discussed. For example, the spacing between the inner edges of the interior longitudinal I beams and the outer edges of the horizontal flanges on the angle beams 92 and 100 is sufficiently wide so that the entire shiftable subassembly can be dropped into place between the I beams 52 and 54 during construction. This spacing provides another advantage in the event of a seismic disturbance that causes vertical relative displacement between the pipe and the ground. In the event of such an occurrence, the supporting framework 22 and vertical support members 16 can merely drop free of the anchor saddle 24, base plate 26, and associated restraining mechanism. Although the present invention has been described only in relation to a preferred embodiment, one of ordinary skill after reading the foregoing specification will be able to make various changes, alterations, and substitutions of equivalents without departing from the intended scope of the invention. For example, a variety of means can be employed to provide the restraining force between the anchor saddle and the supporting framework. Likewise, energy absorbing means other than the crushable honeycomb panels can be employed to decelerate the movement between the anchor saddle and the support framework after a predetermined displacement between the two. It is therefore intended that the grant of Letters Patent for the present invention be limited only by the definitions contained in the appended claims and equivalents thereof.

What is claimed is:

1. A method for interconnecting a continuous section of an aboveground pipeline composed of sections of pipeline rigidly affixed to one another and a series of ground support members comprising the steps of:

mounting a first member having a recess in a circular opening on one of said series of ground support members, and orienting said first member in an upright direction so that the axis of revolution of said opening intersects the path of said pipeline over said one of said series of ground support members, slidably mounting a second member having a spherically shaped surface portion on said pipeline, said spherically shaped surface portion having a radius greater than the radius on said opening in said first member, raising the continuous section of pipeline, positioning said pipeline over said one of said series of ground support members and locating said second member along said pipeline so as to orient said spherically shaped surface portion for partial insertion into said recess in said first member, affixing said second member to said pipeline, interengaging said spherically shaped surface portion of said second member with said recess in said first member while allowing substantially free movement of said second member relative to said first member about said first member's transverse, longitudinal and vertical axes relative to the path of said pipeline over said one of said serie of ground support members as said pipeline rests on said first and second members and orients itself relative to said one of said series of ground support members, relieving substantially all torsional and bending stresses imposed on said pipeline by allowing said second member to substantially freely self-align itself in said first member as said pipeline is raised and positioned over subsequent ground support members, and permanently affixing said first and second members to each other after said pipeline is aligned.

2. The method of claim 1 wherein said first member is permanently affixed to said second member by welding the interengaging portions of said first member and said second member.

3. A method for interconnecting a continuous section of an aboveground pipeline composed of sections of pipeline rigidly affixed to one another and a series of ground support members comprising the steps of:

mounting one of a first member having a recess with a circular opening and a second member having a spherically shaped surface portion on one of said series of ground support members, said spherically shaped surface portion having a radius greater than the radius of said opening, slidably mounting the other of said first and second members on said pipeline, positioning said first member in an upright direction so that the axis of revolution of said circular opening intersects the path of said pipeline over said one of said series of ground support members, raising the continuous section of pipeline, positioning said pipeline over said one of said series of ground support members and locating the member slidably mounted on said pipeline so as to orient said spherically shaped surface portion for partial insertion into said recess in said first member, affixing said member mounted on said pipeline to said pipeline, interengaging said spherically shaped surface portion of said second member with said recess in said first member while allowing substantially free movement of said second member relative to said first member about said first member's transverse, longitudinal and vertical axes relative to the path of said pipeline over said one of said series of ground support members as said pipeline rests on said first and second members and orients itself relative to said one of said series of ground support members, relieving substantially all torsional and bending stresses imposed on said pipeline by allowing said second member to substantially freely self-align itself in said first member as said pipeline is raised and positioned over subsequent ground support members, and permanently affixing said first and second members to each other after said pipeline is aligned.

4. The method of claim 3 wherein said first member is affixed to said ground support member and said second member is slidably mounted on said pipeline.

5. The method of claim 3 wherein said first member is permanently affixed to said second member by welding the adjacent interengaging portions of said first member and said second member.

* * * * *